United States Patent
Krol et al.

(10) Patent No.: US 11,115,305 B2
(45) Date of Patent: Sep. 7, 2021

(54) MOBILE RADIO NETWORK NODE AND METHOD FOR ESTIMATING A CAPACITY OF A LINK IN A RADIO COMMUNICATIONS NETWORK

(71) Applicant: AIRMOBILE AB, Kungsängen (SE)

(72) Inventors: Karol Krol, Kista (SE); Mathias Björkvall, Sollentuna (SE)

(73) Assignee: AIRMOBILE AB, Kungsängen (SE)

( * ) Notice: Subject to any disclaimer, the term of this patent is extended or adjusted under 35 U.S.C. 154(b) by 87 days.

(21) Appl. No.: 16/489,249

(22) PCT Filed: Jan. 24, 2018

(86) PCT No.: PCT/SE2018/050055
§ 371 (c)(1),
(2) Date: Aug. 27, 2019

(87) PCT Pub. No.: WO2018/156065
PCT Pub. Date: Aug. 30, 2018

(65) Prior Publication Data
US 2020/0067807 A1 Feb. 27, 2020
US 2021/0051087 A9 Feb. 18, 2021

(30) Foreign Application Priority Data
Feb. 27, 2017 (SE) .................... 1750211-3

(51) Int. Cl.
*H04L 12/26* (2006.01)
*H04W 24/06* (2009.01)

(52) U.S. Cl.
CPC ...... *H04L 43/0882* (2013.01); *H04L 43/0888* (2013.01); *H04W 24/06* (2013.01)

(58) Field of Classification Search
None
See application file for complete search history.

(56) References Cited

U.S. PATENT DOCUMENTS 7,116,639 B1    10/2006  Gail, Jr. et al.
7,573,886 B1 *   8/2009  Ono .................... H04L 41/0896
                                                         370/352
(Continued)

FOREIGN PATENT DOCUMENTS

CN          102045219 A         5/2011

OTHER PUBLICATIONS

Airmobile AB, International Application No. PCT/SE2018/050055, International Search Report, dated Feb. 7, 2018.
(Continued)

*Primary Examiner* — Jay L Vogel
(74) *Attorney, Agent, or Firm* — Moore & Van Allen PLLC; W. Kevin Ransom

(57) ABSTRACT

A mobile radio network node sends echo request messages to a defined end-point node via a link in a radio communications network. Based on return messages generated in response to the echo request messages a capacity of the link is estimated. The echo request messages contain standardized first and second test messages, where the first test message includes a first amount of data, and the second test message includes a second amount of data exceeding the first amount of data. The capacity of a link in terms of an amount of data communicated per unit time is estimated based on an amount of residue data corresponding to a difference between the second and first amounts of data, and a difference between first and second time intervals.

15 Claims, 2 Drawing Sheets

(56) References Cited

U.S. PATENT DOCUMENTS

| | | | |
|---|---|---|---|
| 8,260,922 B1* | 9/2012 | Aggarwal | H04L 45/24 |
| | | | 709/226 |
| 2004/0001444 A1* | 1/2004 | Sadot | H04L 69/166 |
| | | | 370/252 |
| 2004/0001511 A1 | 1/2004 | Matta | |
| 2004/0243335 A1* | 12/2004 | Gunawardena | H04L 67/1002 |
| | | | 702/116 |
| 2005/0102391 A1* | 5/2005 | Ruutu | H04L 43/0864 |
| | | | 709/224 |
| 2005/0232227 A1 | 10/2005 | Jorgenson et al. | |
| 2007/0025263 A1 | 2/2007 | Dunlap et al. | |
| 2008/0057913 A1* | 3/2008 | Sinha | H04L 63/1416 |
| | | | 455/414.1 |
| 2008/0101277 A1* | 5/2008 | Taylor | H04W 4/029 |
| | | | 370/328 |
| 2010/0142395 A1 | 6/2010 | Yasuie et al. | |
| 2011/0128864 A1* | 6/2011 | Chan | H04L 43/12 |
| | | | 370/252 |
| 2013/0215774 A1* | 8/2013 | Bender | H04W 88/181 |
| | | | 370/252 |
| 2015/0350054 A1 | 12/2015 | Stokking et al. | |
| 2016/0323171 A1* | 11/2016 | Stokking | H04L 43/0888 |

OTHER PUBLICATIONS

Airmobile AB, International Application No. PCT/SE2018/050055, Written Opinion, dated Feb. 7, 2018.

Airmobile AB, International Application No. PCT/SE2018/050055, International Preliminary Report on Patentability, dated Aug. 27, 2019.

\* cited by examiner

MOBILE RADIO NETWORK NODE AND METHOD FOR ESTIMATING A CAPACITY OF A LINK IN A RADIO COMMUNICATIONS NETWORK

CROSS-REFERENCE TO RELATED APPLICATIONS

This application is a national stage application (filed under 35 U.S.C. § 371) of International Application No. PCT/SE2018/050055, filed Jan. 24, 2018, which, in turn, claims priority to Swedish Application No. 1750211-3 filed Feb. 27, 2017; the contents of each of which are hereby incorporated by reference in their entirety.

TECHNICAL FIELD

The invention relates to a mobile radio network node for use in a radio communications network and a method implemented in a mobile radio network node. The invention also relates to a computer program and a non-volatile data carrier.

BACKGROUND

The concept of throughput is a fundamental metric of any telecommunications network. Especially in computer networks, it is important to measure throughput because this benchmarks the network and sets the user expectations on the network capacity. Typically, however, the user-available throughput fluctuates. This is particularly true in radio networks with a shared medium for example WiFi networks (i.e. wireless networks implementing any of the standards in the IEEE 802.11 family) and LTE (Long-Term Evolution) networks, which are two of the most popular access networks to the Internet today.

Normally, the throughput measurement schemes involve sending maximum traffic between two network nodes for a certain amount of time. A number of different tools are available, which implement such a strategy. The measurement can be conducted using different traffic protocols or profiles. Below follows a few examples of known solutions for capacity measurement.

US 2007/0025263 discloses methods and systems for estimating available bandwidth on an internet access network. The method involves: (a) transmitting one or more Internet Control Message Protocol (ICMP) echo request packets to a device residing on the network at a first bit rate; (b) receiving one or more ICMP echo reply packets corresponding to the one or more ICMP echo request packets responsive to step (a); and (c) determining a second bit rate for the one or more ICMP echo reply packets. If the second bit rate is less than the first bit rate, available bandwidth is estimated based on the second bit rate. If the second bit rate is not less than the first bit rate, steps (a), (b) and (c) are repeated. The first bit rate is increased for each iteration, until the second bit rate is less than the first bit rate, and then available bandwidth is estimated based on the second bit rate.

US 2004/0001511 describes a method of estimating bandwidth capacity, available bandwidth and utilization along a path in an IP network. Here, ICMP time-stamp requests are sent from a source host on the edge or inside the network to all routers on the end-to-end path to a desired destination. Differences between time-stamp values are used as indicators of QoS service at each router. The collected measurements are then processed at the sending host to infer QoS parameters in terms of path capacity in bits/sec, available bandwidth in bits/sec, individual link utilization and congestion at each router. These parameters can be combined to infer the QoS service in terms of bandwidth on the end-to-end path.

CN 102045219 shows a method for high-efficiency single-end available bandwidth measurement, which contains the following steps: a transmitting end transmits a specific probe packet train to a destination node; the transmitting end calculates a series of round trip time (RTT) delay values in accordance with a series of ICMP packets returned by the destination node, and determines the time when the round trip time delay starts to remain constant; and the transmitting end calculates the average transmission rate of the packet train within the time period from the time when the packet train starts to be transmitted to the time when the round trip time delay starts to remain constant, and uses the average transmission rate as the measured value of the available bandwidth of the path. Single-end available bandwidth measurement is provided based on the probe packet train, and the available bandwidth value can be measured by only transmitting the probe packet train once. Thus, high measurement accuracy, high convergence speed, low invasion degree and high robustness are attained.

U.S. Pat. No. 7,573,886 describes a method of determining effective bandwidth, where a first packet size is selected, and then a first packet is sent having the first packet size from a first node to a second node. A confirmation that the first packet was received in the second node is received. A transfer time of the first packet is recorded. A second packet size is selected and a second packet having the second packet size is sent from the first node to the second node. A confirmation that the second packet was received in the second node is received and a transfer time of the second packet is recorded. An effective bandwidth between the first node and the second node is calculated and the effective bandwidth can be output.

US 2010/00142395 discloses a band measurement method for measuring a band available for communication with a target device connected via a network. The method includes: transmitting a first request having a first data size and requesting a response having a fixed size to the target device via the network; determining a first time between the transmitting of the first request and the receipt of the response upon receipt of the response; transmitting a second request having a second data size and requesting a response having the fixed size to the target device via the network; determining a second time between transmitting of the second request and the receipt of the response upon receipt of the response; and calculating a first communication band available for transmitting data to the target device by dividing the difference between the first and second data sizes by the difference between the first and second times.

The existing solutions are however problematic for various reasons. For example, according to some of the solutions, during the test, the network is flooded with test traffic. This, in turn, renders the network temporarily unusable for the normal traffic. Therefore, no long-term throughput measurements can be carried out in production networks during operation. Further, the end-points may need to install particular software to generate and/or analyze the test traffic. This substantially limits the number of end-points de facto available. According to other known solutions, the network is less congested by the test traffic. Nevertheless, these solutions provide relatively inaccurate measures of the actual throughput, especially for wireless networks.

SUMMARY

One object of the present invention is therefore to mitigate the above problems and thus offer reliable evaluation of a network's capacity without flooding the network with high amounts of test traffic.

A further object of the invention is to enable dynamic throughput measurements, which can form a basis for positioning a wireless router and/or choosing an appropriate radio channel in a wireless network.

According to one aspect of the invention, these objects are achieved by a mobile radio network node for estimating the capacity of a radio communications network. The mobile radio network node includes: a radio interface, a processor and a memory. The radio interface is configured to exchange data wirelessly via the radio communications network. The memory contains instructions executable by the processor, whereby the mobile radio network node is operative to send echo request messages via a link in the radio communications network to a defined end-point node. The processor executable instructions in the memory further render the mobile radio network node operative to estimate the capacity of the link in the radio communications network based on return messages generated in response to the echo request messages. The return messages originate from the defined end-point node. In particular, the echo request messages comprise first and second test messages. Here, the first test message includes a first amount of data, and the second test message includes a second amount of data exceeding the first amount of data. Additionally, the instructions executable by the processor are further configured to render the mobile radio network node operative to perform a measuring step. In this step, the capacity of the link in the radio communications network is estimated based on (i) an amount of residue data corresponding to a difference between the second and first amounts of data, and (ii) a difference between first and second time intervals. The first time interval is the time elapsed between sending the first test message and receiving a first return message in response thereto, and the second time interval is the time elapsed between sending the second test message and receiving a second return message response thereto.

The proposed mobile radio network node is advantageous because it allows frequently repeated measurements with only marginal influence on the network being analyzed. Moreover, the first and second test messages may be represented by standardized messages included in the most commonly used communication protocols. This, in turn, avoids the need of installing any dedicated software in the defined end-point node.

According to one embodiment of this aspect of the invention, the first and second amounts of data included in the first and second test messages respectively are such that the residue data contains both payload data and overhead data generated by a communication protocol used in the radio communications network. As a result, any negative effects on the throughput caused by various overhead factors are duly taken into consideration, and a realistic throughput measure can be attained.

For example, the first test message may contain a minimal amount of payload data and the second test message may contain an amount of payload data that exceeds one maximum transmission unit in the radio communications network.

This is advantageous because by studying the first test message it is straightforward to deduct the amount of overhead added to each message by the radio network in question, and the second test message provides a basis for studying the effects of frame aggregation in the network. Hence, the network capacity can be estimated relatively accurately.

According to another embodiment of this aspect of the invention, the instructions executable by the processor are specifically configured to render the mobile radio network node operative to send the second test message as soon after sending the first test message as is possible with respect to a communication protocol used in the radio communications network. Namely, thereby, the network conditions experienced by the two messages are as similar as possible. This, in turn, vouches for accuracy when for example using a round-trip time related to the first message to normalize a round-trip time related to the second message.

According to another embodiment of this aspect of the invention, the instructions executable by the processor are further configured to render the mobile radio network node operative to: repeat the measuring step a number of times, say five times; and perform an averaging operation over said number of times to obtain the estimated capacity of the link. Since the proposed measurements only have a very small effect on the other traffic in the network, this causes marginal loads while improving the reliability of measurement result.

According to yet another embodiment of this aspect of the invention, the measuring step involves determining an estimated average throughput, and/or determining an estimated maximum throughput of the link.

For example, the estimated average throughput can be determined as: two times the amount of residue data divided by a denominator in the form of an average round-trip time for the second test message and the second return message over said number of times minus a shortest round-trip time for the first test message and the first return message over said number of times.

Similarly, the estimated maximum throughput can be determined as: two times the amount of residue data divided by a denominator in the form of a shortest round-trip time for the second test message and the second return message during said number of times minus the shortest round-trip time for the first test message and the first return message over said number of times.

According to still another embodiment of this aspect of the invention, the instructions executable by the processor are configured to render the mobile radio network node operative to repeat the measuring step in such a manner that the second amount of data included in the second test message is varied between different transmissions of the second test message over said number of times. For example, in an initial transmission, the second test message may contain a predefined maximum amount of data; and if no second return message is received in response to the second test message, in at least one transmission subsequent to the initial transmission, the second test message may contain an amount of data being less than the predefined maximum amount of data. Thus, in addition to measuring the capacity, it can be checked how large messages that can be passed through the link.

According to a further embodiment of this aspect of the invention, the radio communications network is configured to communicate data according to the ICMP, the Transmission Control Protocol (TCP), the Real-Time Transport Protocol (RTP), the User Datagram Protocol (UDP) and/or the IETF RFC 862 Echo Protocol. The instructions executable by the processor are configured to render the mobile radio network node operative to generate each of the first and second test messages as a respective standardized message in ICMP, TCP RTP, UDP and IETF RFC 862 Echo Protocol respectively, i.e. messages implementing ping functionality under the protocol in question. Consequently, no dedicated software is required in the defined end-point node to employ the proposed procedure.

According to another aspect of the invention, the above objects are achieved by a method performed in a mobile radio network node for estimating a capacity of a radio communications network. The method involves sending echo request messages via a link in the radio communications network to a defined end-point node, and estimating the capacity of the link based on return messages generated in response to the echo request messages, which return messages originate from the defined end-point node. Specifically, the echo request messages contain first and second test messages, where the first test message includes a first amount of data, and the second test message includes a second amount of data exceeding the first amount of data. The method involves a measuring step. Here, the capacity of the link is estimated based on (i) an amount of residue data corresponding to a difference between the second and first amounts of data, and (ii) a difference between first and second time intervals. The first time interval is the time elapsed between sending the first test message and receiving a first return message in response thereto. Analogously, the second time interval is the time elapsed between sending the second test message and receiving a second return message response thereto. The advantages of this method, as well as the preferred embodiments thereof, are apparent from the discussion above with reference to the proposed mobile radio network node.

According to a further aspect of the invention the objects are achieved by a computer program containing instructions which, when executed on at least one processor, cause the at least one processor to carry out the above-described method According to another aspect of the invention the objects are achieved by a non-volatile data carrier containing such a computer program.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DETAILED DESCRIPTION

Figure 1:
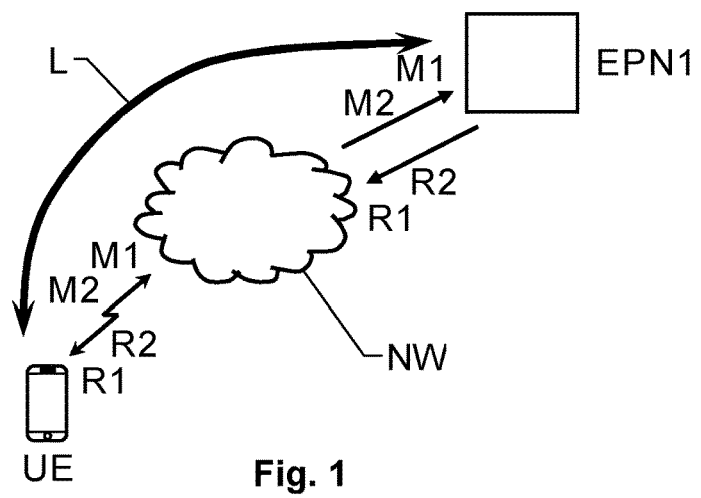
FIG. 1 schematically shows a first embodiment of the invention, wherein a mobile radio network node estimates the capacity of a link to an end-point node in a radio communications network.

A first embodiment of the invention is represented in FIG. 1. Here, we see a schematic representation of a mobile radio network node UE, for example in the form of a user equipment implementing a mobile/cellular telephone, a laptop computer or any other device equipped with a radio interface towards a radio communications network NW.

In any case, the mobile radio network node UE is configured to send echo request messages via a link L in the radio communications network NW to a first defined endpoint node EPN1. Based on return messages generated in response to the echo request messages, the mobile radio network node UE is further configured to estimate the capacity of the link L in terms of throughput (i.e. an amount of data per unit time transmittable via the link L).

More precisely, according to the invention, the echo request messages contain first and second test messages M1 and M2 respectively. The first test message M1 includes a first amount of data, and the second test message M2 includes a second amount of data exceeding the first amount of data.

Preferably, the first test message M1 contains a minimal amount of payload data, in other words no payload data at all. I.e. the first test message M1 may merely be an empty message with the headers normally applied by the communications protocol that is used in the network NW. Typically, in a network NW carrying Internet traffic the communications protocol is the ICMP, the TCP, the RTP and/or the UDP, and the first test message M1 is a message implementing a standardized ping functionality. This means that the first test message M1 may be an ICMP Echo Request message, or equivalent standardized message in TCP RTP, UDP and IETF RFC 862 Echo Protocol respectively.

The second test message M2 contains a well-defined amount of nonzero payload data. Preferably, the second test message M2 contains an amount of payload data that exceeds one maximum transmission unit (MTU) in the radio communications network NW. Namely, medium access control (MAC) techniques in the form of frame aggregation require such payload sizes in order to be engaged. If exclusively messages being shorter than or equal to one MTU were sent, the non-use of frame aggregation would result in an overly optimistic estimate of the actual throughput for the radio communications network NW. In other words, a second test message M2 of with an amount of payload data that exceeding one MTU provides a basis for studying the effects of frame aggregation in the network, so that the network capacity can be estimated relatively accurately. In WiFi, the MTU size is 2304 bytes. This means that it is advantageous if the second test message M2 contains 2305 bytes or more. Preferably, the second test message M2 should contain at least 4608 bytes, so that three or more separate packets must be generated.

The mobile radio network node UE is configured to perform a capacity-measuring step estimating the capacity of the link L in the radio communications network NW. The capacity is estimated based on:

(i) an amount of residue data corresponding to a difference between the second and first amounts of data (i.e. the residue data may be equal to the amount of payload data included in the second test message M2 alone), and (ii) a difference between first and second time intervals, where the first time interval is the time elapsed between sending the first test message M1 and receiving a first return message R1 in response thereto, and the second time interval is the time elapsed between sending the second test message M2 and receiving a second return message R2 response thereto.

Here, it is presumed that both the return messages R1 and R2 have been generated by the end-point node EPN1.

Preferably, the mobile radio network node UE is configured to send the second test message M2 as soon after sending the first test message M1 as is possible with respect to a communication protocol used in the radio communications network NW. Namely, thereby, the probability is comparatively high that both messages M1 and M2 experience similar radio conditions. This, in turn, improves the quality of the capacity estimate.

According to one embodiment of the invention, the measuring step specifically determines an estimated average throughput via the link L over a number of repeated measurements. To this aim, the mobile radio network node UE is preferably configured to determine the estimated average throughput as:

$$\frac{2D}{MSG2RTT_{AVG} - MSG1RTT_{MIN}} \text{ [amount of data/unit time]}$$

where D is the amount of residue data,
  $MSG1RTT_{MIN}$ is a shortest round-trip time for the first test message M1 and the first return message R1 over as many times as the measurements have been repeated, and
  $MSG2RTT_{AVG}$ is an average round-trip time for the second test message M2 and the second return message R2 over said number of times.

The factor 2 in the numerator is included in the expression due to the fact that the return messages R1 and R2 are presumed to contain the same amount of data as the corresponding test messages M1 and M2 respectively.

Alternatively, or in addition to determining the estimated average throughput, the measuring step may determine an estimated maximum throughput of the link L. To this aim, the mobile radio network node UE is preferably configured to determine the estimated maximum throughput as:

$$\frac{2D}{MSG2RTT_{AVG} - MSG1RTT_{MIN}} \text{ [amount of data/unit time]}$$

where D is the amount of residue data,
  $MSG1RTT_{MIN}$ is the shortest round-trip time for the first test message M1 and the first return message R1 over as many times as the measurements have been repeated, and
  $MSG2RTT_{MIN}$ is a shortest round-trip time for the second test message M2 and the second return message R2 during said number of times.

According to another embodiment of the invention, the mobile radio network node UE is specifically configured to repeat the measuring step in such a manner that the second amount of data included in the second test message M2 is varied between different transmissions of the second test message M2 throughout the repeated measurements.

For instance, when estimating the capacity of a link L in the radio communications network NW, the following procedure can be applied:

1. Select an averaging window, i.e. a number of times specifying how many repeated measurements that are to be performed. Consequently, the averaging window size can be 10. However, of course, any other larger or smaller integer number is equally well conceivable. The averaging window size is preferably assigned as a global variable in the settings of a computer program in the mobile radio network node UE carrying out the proposed method.
2. Select an end-point node EPN1. The mobile radio network node UE is assumed to be one end-point of the link L, and EPN1 is assumed to be the other. Preferably, the computer program in the mobile radio network node UE is configured to perform a local network discovery and present a list of available devices representing potential end-point nodes. A user of the mobile radio network node UE may then select the end-point node EPN1 from the list. Alternatively, the user may identify the end-point node EPN1 by typing in a host name or an IP address of the end-point node EPN1.
3. Set sizes of the first and second test messages M1 and M2. As mentioned above, the first test message M1 preferably contains no payload data; and naturally, the larger the size of the second test message M2, the more data will be sent in in each measurement cycle. For high-speed networks a relatively large size of the second test message M2 appropriate, say 64 Kbytes; whereas if for example the link L passes over the Internet a smaller size of the second test message M2 is suitable. In any case, an initial transmission of the second test message M2 may contain a predefined maximum amount of data. If no second return message R2 is received in response to the second test message M2 (before a time-out timer expires), in at least one transmission subsequent to the initial transmission, the second test message M2 is generated such that this message contains an amount of data being less than the predefined maximum amount of data. For example, the size of the second test message M2 may be stepwise reduced for each iteration measurement cycle.
4. Simulated traffic is generated by (4a) sending a first test message M1, (4b) receiving a first return message R1, (4c) sending a second test message M2 and (4d) receiving a second return message R2 (provided that the time-out timer did not expire), and repeating this procedure as many times as specified by the averaging window.
5. Calculate average round trip times (RTT) for the simulated traffic. In particular, this may involve calculating the above-mentioned parameters $MSG1RTT_{AVG}$ and $MSG2RTT_{AVG}$. In addition, the above-mentioned parameter $MSG2RTT_{MIN}$ is determined, if the estimated maximum throughput is to be presented.
6. Calculate the estimated average throughput and/or the estimated maximum throughput.

Finally, provided that both the estimated average throughput and the estimated maximum throughput are calculated, a network efficiency NE can be determined as:

$$NE = \frac{THRUP_{AVG}}{THRUP_{MAX}},$$

where $THRUP_{AVG}$ is the estimated average throughput and $THRUP_{MAX}$ is the estimated maximum throughput.

It is generally advantageous if the estimated average throughput $THRUP_{AVG}$, the estimated maximum throughput $THRUP_{MAX}$ and/or the network efficiency NE is/are presented in "real time" while the measurements are being executed. Further preferably, the parameters $THRUP_{AVG}$, $THRUP_{MAX}$ and/or NE can be presented graphically, for example in the form of a so-called heat map illustrating the capacity of the radio communications network in terms of amounts of data transmittable per unit of time at respective positions on a map or a plan.

Figure 2:
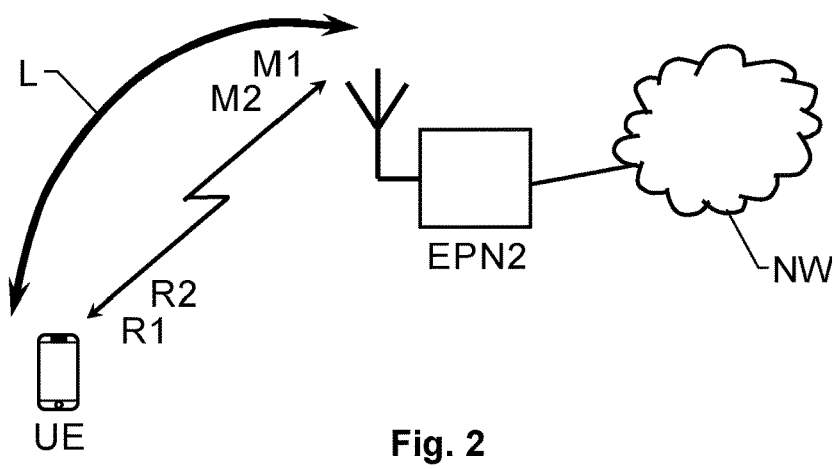
FIG. 2 schematically shows a second embodiment of the invention, wherein a mobile radio network node estimates the capacity of a link to an end-point node in a radio communications network.

Such a heat-map representation is particularly well suited to illustrate the results of the measurements performed in an environment shown in FIG. 2. Here, we see a second embodiment of the invention, where the mobile radio network node UE estimates the capacity of a link to a second end-point node EPN2 in a radio communications network NW. The second end-point node EPN2 is equipped with a radio interface configured to communicate wirelessly directly with the mobile radio network node UE. Thus, the mobile radio network node UE may be repositioned while estimating the capacity of a link L between the mobile radio network node UE and the second end-point node EPN2. Thereby, any hotspots, radio shadows and/or other anomalies in a coverage area for the second end-point node EPN2 can be identified and documented.

In a WiFi network the maximal attainable throughput is the highest possible throughput for the mobile radio network node UE at a particular physical location, and the average throughput is the actual throughput achieved by the mobile radio network node UE in this physical location.

High network efficiency NE indicates comparatively little competing traffic on the channel, and relatively low jitter transmission, which is especially important for low latency applications like VoIP (Voice over IP). Analogously, low network efficiency indicates a high channel utilization, which is typical for a highly trafficked network, and/or a network with high amounts of interference.

Due to the round-trip nature of the proposed solution, it may be relevant to present the capacity in a round-trip scenario. In general, the actual throughputs in an uplink and a downlink of the link L are different. A weighted value $THRUP_L$ may thus be determined as:

$$THRUP_L = \frac{2 \cdot THRUP_{DL} \cdot THRUP_{UL}}{THRUP_{DL} + THRUP_{UL}},$$

where: $THRUP_{UL}$ is an estimated throughput in the uplink, and
$THRUP_{DL}$ is an estimated throughput in the downlink.

| $THRUP_{DL}$ | 2 | 5 | 8 | 10 | 12 | 15 | 18 |
|---|---|---|---|---|---|---|---|
| $THRUP_{UL}$ | 18 | 15 | 12 | 10 | 8 | 5 | 2 |
| $THRUP_L$ | 3.6 | 7.5 | 9.6 | 10 | 9.6 | 7.5 | 3.6 |

Table exemplifying throughput values in Mbps, where a sum of $THRUP_{DL}$ and $THRUP_{UL}$ is 20 Mbps in each case.

According to the invention, an amount of test traffic generated by each test cycle is caused by the two test messages M1 and M2 and the corresponding return messages R1 and R2 respectively.

For example, in ICMP, the total amount of data sent, above the IP layer, will be two ICMP headers plus an amount of payload D times two. The header is 8 bytes and we assume that D is 64 KB. The maximal amount of data then becomes 2·(2·8+64 000)=128 032 bytes or 64 016 bytes per direction. The decimal kilo-prefix is assumed. Provided that, a test cycle is performed once per second or less frequently, the overall test-traffic throughput becomes approximately 1 Mbps in total, or 0.5 Mbps each direction, which should be acceptable in most of today's networks.

As mentioned earlier, the capacity of low throughput networks is preferably tested via lower payloads and/or with longer test cycle periods to limit the overall test-traffic generated.

Figure 3:
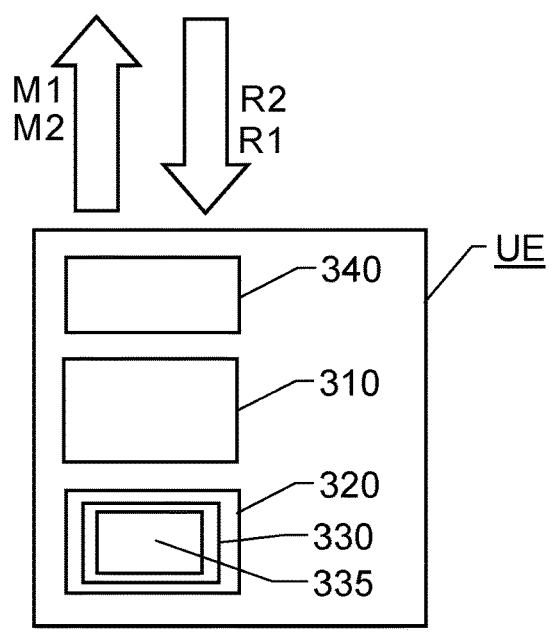
FIG. 3 shows a block diagram over a mobile radio network node according to one embodiment of the invention.

FIG. 3 shows a block diagram over a mobile radio network node UE according to one embodiment of the invention for use in a radio communications network NW to estimate the capacity of a link to a defined end-point node EPN1 or EPN2 in the network NW. In addition to a radio interface 340, the mobile radio network node UE includes a processor 310 and a memory 320. The memory 320 is a non-volatile data carrier containing the computer program product 330 with instructions 335 executable by the processor 310, whereby the mobile radio network node UE is operative to effect the above-described measures.

Figure 4:
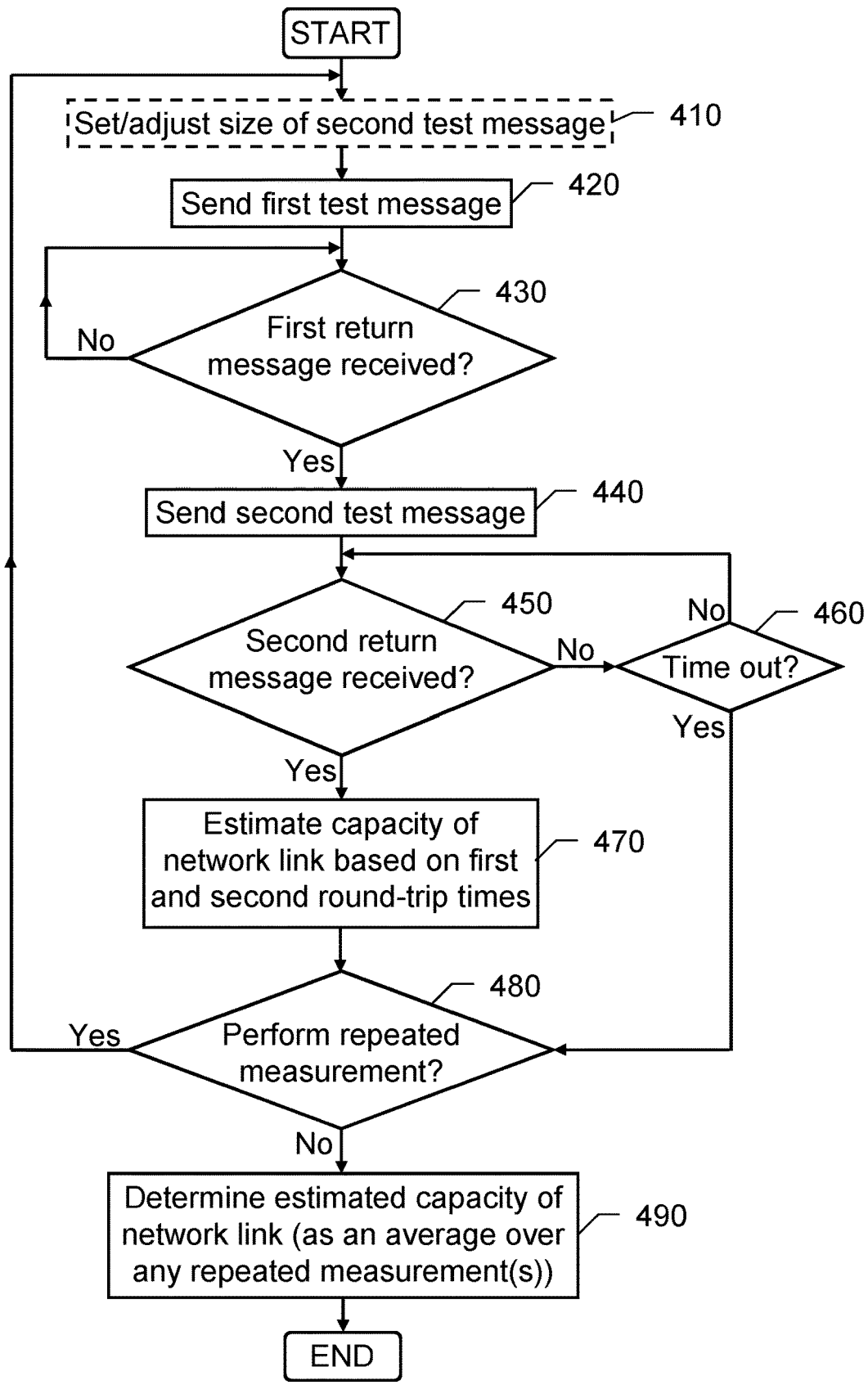
FIG. 4 illustrates, by means of a flow diagram, a method according to one embodiment of the invention.

In order to sum up, and with reference to the flow diagram in FIG. 4, we will now describe a method according to one embodiment of the invention for a mobile radio network node UE for use in a radio communications network NW to estimate the capacity of a link to a defined end-point node EPN1 or EPN2 in the network NW.

In a first step 410, the size of the second test message M2 is set. Step 410 is optional. This means that if the second test message always has a fixed size, step 410 is empty (i.e. involves no action). However, as will be discussed below, it is advantageous if, in subsequent iterations of the measuring steps, the size of the second test message M2 can be adjusted (e.g. be reduced stepwise).

Then, in a step 420, the first test message M1 is sent to the defined end-point node EPN1 or ENP2. The first test message M1 preferably has a minimal size. This is advantageous because it improves the chances of obtaining a response with a relatively short delay; and more important, if no payload data is included in the first test message M1, it is straightforward to calibrate the measurement with respect to overhead data of the protocol.

A step 430 thereafter checks if a first return message R1 has been received in response to the first test message M1. If so, a step 440 follows; and otherwise, the procedure loops back and stays in step 430.

In step 440, the second test message M2 is sent to the defined end-point node, and subsequently a step 450 checks if a second return message R2 has been received in response to the second test message M2. If so, a step 470 follows; and otherwise, the procedure continues to a step 460 in which it is checked whether or not a time-out timer has expired. If the time-out timer still runs, the procedure loops back to step 450; and otherwise, a step 480 follows.

In step 470, a capacity (typically in terms of amount of data per unit time, e.g. bits/s) is estimated based on the round-trip times for the first and second test messages M1 and M2 and the corresponding return messages R1 and R2 respectively. Then, step 480 follows in which it is checked if a repeated measurement should be performed. For example, to obtain a relatively reliable estimate, the measurement may be performed ten times. Thus, after having completed the first measurement, nine additional iterations follow. Provided that at least one more measurement is to be performed, the procedure loops back to step 410.

As mentioned above, if the second test message M2 always has a fixed size, step 410 is empty (i.e. involves no action). However, if, for instance the time-out timer expired in step 460 in a previous iteration, step 410 preferably involves adjusting the size of the second test message M2 to contain a smaller amount of data
thus improving the chances of obtaining a second return message R2 before the time-out timer expires.

If, in step 480 it is determined that no further measurements should be performed, a step 490 follows. Here, the capacity of the capacity of the link to the defined end-point node EPN1 or EPN2 is estimated, either based on a single measurement, or based on an average over repeated measurements. Thereafter, the procedure ends.

All of the process steps, as well as any sub-sequence of steps, described with reference to FIG. 4 above may be controlled by means of at least one programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A mobile radio network node for estimating the capacity of a radio communications network, the mobile radio network node comprising:
   a radio interface configured to exchange data wirelessly via the radio communications network,
   a processor,
   and a memory containing instructions executable by the processor whereby the mobile radio network node is operative to:
   send echo request messages via a link in the radio communications network to a defined end-point node, and
   estimate the capacity of the link in the radio communications network based on return messages generated in response to the echo request messages, which return messages originate from the defined end-point node, wherein the echo request messages comprise first and second test messages, where the first test message includes a first amount of data, and the second test message includes a second amount of data exceeding the first amount of data;
   perform a measuring step, wherein the capacity of the link in the radio communications network is estimated based on an amount of residue data corresponding to a difference between the second and first amounts of data, and a difference between first and second time intervals, where the first time interval is the time elapsed between sending the first test message and receiving a first return message in response thereto, and the second time interval is the time elapsed between sending the second test message and receiving a second return message response thereto;
   repeat the measuring step a number of times; and
   perform an averaging operation over said number of times to determine an estimated average throughput as:

$$\frac{2D}{MSG2RTT_{AVG} - MSG1RTT_{MIN}} \text{ [amount of data/unit time]}$$

and determine an estimated maximum throughput as:

$$\frac{2D}{MSG2RTT_{MIN} - MSG1RTT_{MIN}} \text{ [amount of data/unit time]}$$

where: D is the amount of residue data,
   $MSG1RTT_{MIN}$ is a shortest round-trip time for the first test message M1 and the first return message R1 over said number of times,
   $MSG2RTT_{AVG}$ is an average round-trip time for the second test message M2 and the second return message R2 over said number of times, and
   $MSG2RTT_{MIN}$ is a shortest round-trip time for the second test message M2 and the second return message R2 during said number of times.

2. The mobile radio network node according to claim 1, wherein the first and second amounts of data included in the first and second test messages respectively are such that the residue data comprises both payload data and overhead data generated by a communication protocol used in the radio communications network.

3. The mobile radio network node according to claim 2, wherein the first test message contains a minimal amount of payload data and the second test message contains an amount of payload data exceeding one maximum transmission unit in the radio communications network.

4. The mobile radio network node according to claim 2, wherein the instructions executable by the processor are further configured to render the mobile radio network node operative to:
   send the second test message as soon after sending the first test message as is possible with respect to a communication protocol used in the radio communications network.

5. The mobile radio network node according to claim 1, wherein the instructions executable by the processor are configured to render the mobile radio network node operative to repeat the measuring step in such a manner that the second amount of data included in the second test message is varied between different transmissions of the second test message over said number of times.

6. The mobile radio network node according to claim 5, wherein the instructions executable by the processor are configured to render the mobile radio network node operative to:

in an initial transmission of said number of times, generate the second test message such that the second test message contains a predefined maximum amount of data; and if no second return message is received in response to the second test message in at least one transmission subsequent to the initial transmission of said number of times, generate the second test message such that the second test message contains an amount of data being less than the predefined maximum amount of data.

7. The mobile radio network node according to claim 1, wherein the radio communications network is configured to communicate data according to at least one of: the Internet Control Message Protocol, ICMP; the Transmission Control Protocol, TCP; the Real-Time Transport Protocol, RTP; the User Datagram Protocol, UDP; and the IETF RFC 862 Echo Protocol, and the instructions executable by the processor are configured to render the mobile radio network node operative to generate each of the first and second test messages as a respective standardized message in ICMP, TCP RTP, UDP and IETF RFC 862 Echo Protocol respectively.

8. A method performed in a mobile radio network node for estimating a capacity of a radio communications network, the method comprising:

sending echo request messages via a link in the radio communications network to a defined end-point node;

estimating the capacity of the link in the radio communications network based on return messages generated in response to the echo request messages, which return messages originate from the defined end-point node, wherein the echo request messages comprising first and second test messages, where the first test message includes a first amount of data, and the second test message includes a second amount of data exceeding the first amount of data;

a measuring step, wherein the capacity of the link in the radio communications network is estimated based on an amount of residue data corresponding to a difference between the second and first amounts of data, and a difference between first and second time intervals, where the first time interval is the time elapsed between sending the first test message and receiving a first return message in response thereto, and the second time interval is the time elapsed between sending the second test message and receiving a second return message response thereto;

repeating the measuring step a number of times;

performing an averaging operation over said number of times to determine an estimated average throughput as:

$$\frac{2D}{MSG2RTT_{AVG} - MSG1RTT_{MIN}} \text{ [amount of data/unit time]}$$

and determine an estimated maximum throughput as:

$$\frac{2D}{MSG2RTT_{MIN} - MSG1RTT_{MIN}} \text{ [amount of data/unit time]}$$

where: D is the amount of residue data, $MSG1RTT_{MIN}$ is a shortest round-trip time for the first test message M1 and the first return message R1 over said number of times, $MSG2RTT_{AVG}$ is an average round-trip time for the second test message M2 and the second return message R2 over said number of times, and $MSG2RTT_{MIN}$ is a shortest round-trip time for the second test message M2 and the second return message R2 during said number of times.

9. The method according to claim 8, wherein the first and second amounts of data included in the first and second test messages respectively are such that the residue data comprises both payload data and overhead data generated by a communication protocol used in the radio communications network.

10. The method according to claim 9, wherein the first test message contains a minimal amount of payload data and the second test message contains an amount of payload data exceeding one maximum transmission unit in the radio communications network.

11. The method according to claim 8, wherein the method involves sending the second test message as soon after sending the first test message as is possible with respect to a communication protocol used in the radio communications network.

12. The method according to claim 8, wherein the repeating of the measuring step involves varying the second amount of data included in the second test message between different transmissions of the second test message over said number of times.

13. The method according to claim 12, wherein:

in an initial transmission of said number of times, the second test message contains a predefined maximum amount of data; and if no second return message is received in response to the second test message in at least one transmission subsequent to the initial transmission of said number of times, the second test message contains an amount of data being less than the predefined maximum amount of data.

14. The method according to claim 8, wherein the radio communications network is configured to communicate data according to at least one of: the Internet Control Message Protocol, ICMP; the Transmission Control Protocol, TCP; the Real-Time Transport Protocol, RTP; the User Datagram Protocol, UDP; and the IETF RFC 862 Echo Protocol, and each of the first and second test messages and each of the first and second return messages is a standardized message in ICMP, TCP RTP, UDP and/or IETF RFC 862 Echo Protocol respectively.

15. A computer program product embodied on a non-transitory computer-readable medium, the computer program product comprising instructions which, when executed on at least one processor, cause the at least one processor to carry out a method performed in a mobile radio network node for estimating a capacity of a radio communications network, the method comprising:

sending echo request messages via a link in the radio communications network to a defined end-point node, and estimating the capacity of the link in the radio communications network based on return messages generated in response to the echo request messages, which return messages originate from the defined end-point node, wherein the echo request messages comprising first and second test messages, where the first test message includes a first amount of data, and the second test message includes a second amount of data exceeding the first amount of data; and the method comprises:

a measuring step, wherein the capacity of the link in the radio communications network is estimated based on an amount of residue data corresponding to a difference between the second and first amounts of data, and a difference between first and second time intervals, where the first time interval is the time elapsed between sending the first test message and receiving a first return message in response thereto, and the second time interval is the time elapsed between sending the second test message and receiving a second return message response thereto;

repeating the measuring step a number of times;

performing an averaging operation over said number of times to determine an estimated average throughput as:

$$\frac{2D}{MSG2RTT_{AVG} - MSG1RTT_{MIN}} \text{[amount of data/unit time]}$$

and determine an estimated maximum throughput as:

$$\frac{2D}{MSG2RTT_{MIN} - MSG1RTT_{MIN}} \text{[amount of data/unit time]}$$

where: D is the amount of residue data, $MSG1RTT_{MIN}$ is a shortest round-trip time for the first test message M1 and the first return message R1 over said number of times, $MSG2RTT_{AVG}$ is an average round-trip time for the second test message M2 and the second return message R2 over said number of times, and $MSG2RTT_{MIN}$ is a shortest round-trip time for the second test message M2 and the second return message R2 during said number of times.

* * * * *